(12) United States Patent
Larsen et al.

(10) Patent No.: US 10,430,265 B2
(45) Date of Patent: Oct. 1, 2019

(54) ERROR REPORT NORMALIZATION

(71) Applicant: The Regents of the University of California, Oakland, CA (US)

(72) Inventors: Per Larsen, Irvine, CA (US); Stefan Brunthaler, Irvine, CA (US); Michael Franz, Irvine, CA (US)

(*) Notice: Subject to any disclaimer, the term of this patent is extended or adjusted under 35 U.S.C. 154(b) by 55 days.

(21) Appl. No.: 15/514,811

(22) PCT Filed: Oct. 1, 2015

(86) PCT No.: PCT/US2015/053574
§ 371 (c)(1),
(2) Date: Mar. 27, 2017

(87) PCT Pub. No.: WO2016/054426
PCT Pub. Date: Apr. 7, 2016

(65) Prior Publication Data
US 2017/0220405 A1 Aug. 3, 2017

Related U.S. Application Data

(60) Provisional application No. 62/058,485, filed on Oct. 1, 2014.

(51) Int. Cl.
*G06F 11/00* (2006.01)
*G06F 11/07* (2006.01)
*G06F 21/54* (2013.01)

(52) U.S. Cl.
CPC ...... *G06F 11/0775* (2013.01); *G06F 11/0706* (2013.01); *G06F 21/54* (2013.01)

(58) Field of Classification Search
CPC ............ G06F 11/0775; G06F 11/0706; G06F 11/0703; G06F 11/0718; G06F 11/0766;
(Continued)

(56) References Cited

U.S. PATENT DOCUMENTS

2004/0107387 A1* 6/2004 Larsson ............ G06F 11/0775
714/39
2004/0255185 A1 12/2004 Fujiyama et al.
(Continued)

OTHER PUBLICATIONS

Mishra, Mohit. "The Problem of Normalization of Diversified Error-reporting in Software Diversity". Third Student Research Symposium (SRS), International Conference on Advances in Computing,Communications and Informatics (ICACCI' 14), Sep. 24-27, 2014, Delhi, India. (Year: 2014).*
(Continued)

*Primary Examiner* — Anthony J Amoroso
(74) *Attorney, Agent, or Firm* — Klein, O'Neill & Singh, LLP

(57) ABSTRACT

Error report reporting errors that occur during software execution may be normalized to account for diversification of single software program. A method for useful providing error reports comprises receiving information regarding computer system status at a time of failure of proper execution of a diversified implementation of a computer program, the computer program having a plurality of diversified implementations; and transforming the information regarding the computer system status using metadata indicative of differences between the diversified implementation of the computer program and a canonical implementation of the computer program.

19 Claims, 4 Drawing Sheets

(58) Field of Classification Search
CPC ............. G06F 11/0769; G06F 11/0778; G06F 11/0784; G06F 11/0787; G06F 21/54
See application file for complete search history.

(56) References Cited

U.S. PATENT DOCUMENTS

| | | | |
|---|---|---|---|
| 2006/0026451 A1* | 2/2006 | Voigt | G06F 11/0727 714/2 |
| 2008/0016314 A1 | 1/2008 | Li et al. | |
| 2012/0137182 A1* | 5/2012 | Zhang | G06F 11/0775 714/48 |

OTHER PUBLICATIONS

Mohit Mishra, "The Problem of Normalization of Diversified Error-reporting in Software Diversity", Third Student Research Symposium (SRS), International Conference on Advances in Computing, Communications and Informatics (ICACCI' 14), Sep. 24-27, 2014, Delhi, India.

Per Larsen, et al., "Sok: Automated Software Diversity", Security and Privacy (SP), 2014 IEEE Symposium on. IEEE, Apr. 9, 2014.

Roopak Venkatakrishnan, "Redundancy-Based Detection of Security Anomalies in Web-Server Environments" Apr. 21, 2014.

International Search Report on related PCT Application No. PCT/US2015/053574 from International Searching Authority (KIPO) dated Feb. 24, 2016.

Written Opinion on related PCT Application No. PCT/US2010/059332 from International Searching Authority (KIPO) dated Feb. 24, 2016.

* cited by examiner

ERROR REPORT NORMALIZATION

CROSS-REFERENCE TO RELATED APPLICATION

This application is a national phase filing, under 35 U.S.C. § 371(c), of International Application No. PCT/US2015/053574, filed Oct. 1, 2015, with claim of priority to U.S. Provisional Patent Application No. 62/058,485, filed on Oct. 1, 2014, the disclosures of which are incorporated herein by reference in their entirety.

This invention was made with Government support under Grant No. N660001-1-2-4014 awarded by the Defense Advanced Research Projects Agency. The Government has certain rights in this invention.

BACKGROUND OF THE INVENTION

The present invention relates generally to error reporting for software programs, and more particularly to error reporting for diversified software programs.

The idea behind software diversity is that artificially introduced differences between programs and program executions break or complicate certain unwanted behaviors—including, but not limited to exploitation of vulnerabilities in software, reverse-engineering, etc. Unless otherwise noted, software, program, and application are used interchangeably.

Error reports alert software developers to crashes and problems that occur in the field and during testing. Software developers use error reports to reproduce, understand, prioritize, and correct software defects. Some types of software diversity, however, make error reports corresponding to a single defect diverge from one another. Left unaddressed, this reduces the utility of automated error reporting.

Software diversity is a broad family of code protection techniques. The idea is biologically inspired. In nature, animals and plants procreate via sexual reproduction as opposed to cloning. This is no coincidence. Among other things, genetic mutation and recombination offers probabilistic protection against biological hazards. Consider the case of a virus outbreak: some animals in a heard will die while others will live to see another day because immune systems are not identical clones. Information technology, on the other hand, is an entirely man-made domain in which standardization and a software monoculture has virtually eliminated what modest diversity was initially there. Standardization has numerous advantages however. Software and hardware manufacturers enjoy economies of scale. In particular, cloning makes it cheap and easy to deploy a single master program copy to millions of similar machines.

Unfortunately, adversaries in cyber-space enjoy economies of scale, too. They can easily construct a test bed mirroring that of their victims.

They can then probe the software running in the testbed for vulnerabilities, i.e., coding errors (also known as bugs) that can be exploited to gain unauthorized access to the system. Vulnerabilities are bugs that attackers can exploit. Once attackers have constructed an exploit, they can unleash it against millions of users. The exploit will reliably compromise everyone running the vulnerable software targeted by the exploit. The exploitation techniques used today are able to sidestep currently deployed defenses. However, even seemingly small differences between the attacker and victim systems can cause the exploits to fail.

Software diversity (also known as program randomization or program evolution) varies program implementation aspects from system to system and/or from one program execution to another. Whenever an exploit relies on the implementation aspect being randomized, e.g. code addresses, the attacker fails to achieve his objective. Diversity is a probabilistic defense in the sense that the underlying program weaknesses are still present; their manifestation in each program variant, however, is affected by diversity such that mass exploitation becomes significantly harder. Targeted attacks become much harder too, since adversaries no longer have access to the program variant running on the target system.

Automatic error reporting is used to collect program errors and crashes that occur after software has been released for testing or released for production use. It is difficult for software developers to know where and how an application crashes without these reports since many users are not proactive about manually reporting crashes. In absence of formal software verification, it is nigh impossible to remove all defects before the software is released to users. The current practice is for software to be tested by the software developer and possibly a dedicated quality assurance team. This removes the most obvious programming errors. After this initial testing stage, an alpha release of the software is typically distributed to a select group of users. Following the alpha release, many bugs are addressed which results in a beta release that is typically tested by a larger group of users. The successful conclusion of the best testing process results in a final release—a golden master that until recently was cloned and distributed to users on physical media. To optimize the reporting of errors back to users, programs (or the operating system hosting the programs) can automatically detect and report certain types of errors. Upon detection, a report describing the error—typically in terms of the machine state at the time of the crash—is automatically generated. These error reports are then transmitted over the Internet back to the software vendor; directly or through the operating system vendor.

Software vendors have several uses of automatic error reports. First and foremost, they alert developers to the presence of defects and help reproduce them. Second, error reports can be aggregated and correlated. This is particularly important for software released for production use; the most popular software products can have hundreds of millions of users and therefore generate a high volume of error reports. By correlating error reports, software developers save time by not investigating the same error twice. After an error has been removed, its corresponding error reports can safely be ignored. Finally, not all errors are equally important. Typically, the most frequently reported errors are prioritized and fixed before infrequent errors.

Correlation uses the machine state recorded at the time of the error. Typically, the machine state indicates where in the program the error occurred by summarizing the contents of the stack, heap, and registers and possibly operating system state such as open files and network connections.

Since most programs are shipped without debugging information (meta-data that correlates machine code constructs with their corresponding source-code constructs), the stack contents are summarized in terms of machine code addresses. Since software diversity often makes machine code addresses diverge, multiple users recording the exact same error will report different stack contents which in turn interferes with error report correlation.

A limited form of diversity is deployed today in the form of Address Space Layout Randomization, ASLR. With ASLR, the base address of each individual memory segment (the heap, stack, code segment, etc.) is randomized. While the details and security properties vary from one operating system to another, this type of randomization is uniformly coarse-grained since it shifts every address within a memory segment by the same amount. While this is a weakness in terms of its ability to thwart cyber-attacks, ASLR does not necessarily interfere with errorreporting. In particular, an error report that summarizes the stack contents using (modulename, functionname, functionoffset)-tuples is unaffected by ASLR. Consider crashes happening at offset 42 within the function foo in the library libbar.so for example. For each run, the base address of libbar.so (and by implication, the address of the function foo) will vary but the crash consistently happens at offset 42 within foo, so identifying modules and functions by name rather than address hides the effects of ASLR. Module-relative code addresses are also easy to normalize; one simply subtracts the module base address. The same is not true for fine-grain approaches to software diversity. Continuing the example in context of fine-grain diversity, the offset of the crash within the function foo would vary from one run to another thereby interfering with error report correlation.

Automatic error reports are not only consumed by software developers and operating system vendors. Some organizations run Security Information and Event Management (SIEM) software to monitor their IT infrastructure for compliance and to detect signs of cyber-breaches, intrusions, and other critical events. We consider SIEMs another sink for error report, separate from servers run by software developers, but with the same need to normalize error reports to hide the effects of diversity and allow correlation. We do not distinguish between consumers of automatic error reports henceforth.

These and other aspects of the invention are more fully comprehended upon review of this disclosure.

BRIEF SUMMARY OF THE INVENTION

This invention comprises techniques that transform or normalize error reports to remove the effects of software diversification. By reducing interference by software diversity on, and in some embodiments ensuring that software diversity does not interfere with, the discovery and correction of software defects, the invention increases the practicality of diversity as a cyber-defense mechanism.

Some embodiments of aspects of the invention provide for generating, storing, transmitting and operating on program meta-data that encodes the effects of one or more program transformations individually, encodes the aggregate effects of one or more program transformations, or an arbitrary combination of the above; such that the effects of software diversity can be fully or partially removed from error reports.

Some embodiments of aspects of the invention provide for a mechanism for normalization of error reports such that they appear to have come from software that has not been diversified. Normalization can happen before or during symbolication of error reports. This mechanism can be stored and execute on the computer system reporting the error, or on the computer system collecting the error ports, or on an auxiliary, third computer system, or any combination thereof; which may integrate with error reporting mechanisms that are not necessarily diversity aware.

In some embodiments aspects of the invention further provide for optionally operating on meta-data to capture the effects of software diversification in sufficient detail to translate a diversified error report to the error report generated by a canonical program implementation or symbolicate a diversified error report, created and stored on the computer experiencing the error, or a computer belonging to the software developer, or a third-party server; optionally being uniquely identified by a seed value, optionally being compressed, optionally being encrypted, optionally containing decoy data to mislead adversaries, optionally being subdivided into separately stored sets of metadata, and/or optionally being versioned; with the meta-data decryption key or keys being stored separately from the normalization metadata itself being linked to the seed value (identifying a diversified program) or a value derived from it.

In some aspects the error report normalization function is optionally versioned or optionally programmable and extensible, by means of interpreting an (optionally diversified) instruction stream or by means of executing (optionally diversified) machine instructions, both of which can be stored locally or downloaded on-demand, or both of which can be customized according to: the location of the error and any other machine state, the frequency of the error, the life-cycle of the program, the availability of program updates or status of the bug, or custom data collected at the time of the error, and both of which may contain decoy elements.

Some aspects in accordance with the invention provide a method useful in providing error reports for computer program execution on a computer system, comprising receiving information regarding computer system status at a time of failure of proper execution of a diversified implementation of a computer program, the computer program having a plurality of diversified implementations; and transforming the information regarding the computer system status using meta-data indicative of differences between the diversified implementation of the computer program and a canonical implementation of the computer program.

Some aspects in accordance with the invention provide a non-transitory computer readable memory storing program instructions, the program instructions comprising program instructions to configure at least one processor to at least partially transform an error report indicating status of a computer at a time of error in operation of a diversified implementation of a computer program to an at least partially normalized error report that at least partially removes effects of diversification of the computer program that resulted in the diversified implementation.

These and other aspects of the invention are more fully comprehended upon review of this disclosure.

DETAILED DESCRIPTION

The remainder of the document describes how various aspects of the invention address the effects of software diversity in automatically generated error reports.

Figure 1:
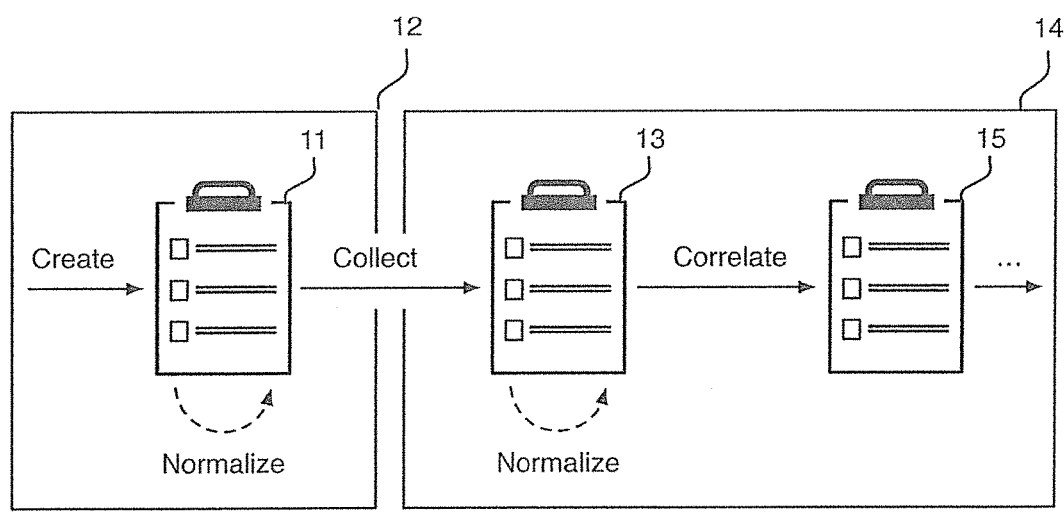
FIG. 1 is a block diagram showing automatic reporting of errors with normalization in accordance with aspects of the invention.

FIG. 1 shows an example error reporting process. The detection of an error triggers the creation of an error report 11 on the client system 12 hosting the program. A copy of the error report 13 is collected by a centralized service 14 typically hosted by a server separately from the client. On this server, incoming error reports are correlated and deduplicated. Each deduplicated error report 15 is stored along with a count of received duplicates, for example as a proxy for the inconvenience caused by the bug. After deduplication, further processing of error reports take place. For instance, they may be symbolicated such that machine-level information (e.g. the register contents) are translated into source code construct (e.g. variables) to help developers troubleshoot the issue.

Normalization aspects of the invention adds one or more normalization steps to the error reporting process; the additional steps are drawn as dashed arrows in FIG. 1. The normalization steps can run on the client reporting the error, on the system collecting the errors, on an auxiliary server, or any combination thereof. The goal of the normalization step is to hide the effects of diversification—fully or partially—from the correlation and any following steps in the error reporting process and any subsequent uses of the error reports by software developers.

Figure 2:
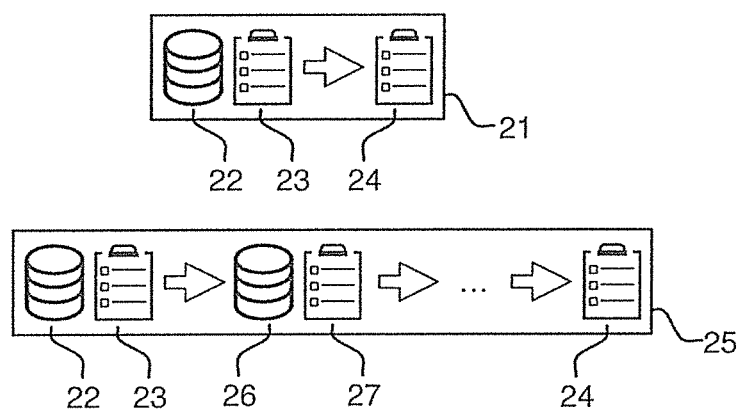
FIG. 2 is a block diagram showing a single-step normalization and multi-step normalization in accordance with aspects of the invention.

An example normalization process is shown in FIG. 2. The overall normalization process can be thought of as a binary function N whose inputs are diversification meta-data 22 and a diversified error report 23. The result of applying N is a normalized error report 24. Normalization can be staged such that the normalized error report is the result of a sequence of transformation steps 25 with each transformation step using (possibly unique) meta-data 22, 26 to produce a sequence of partially normalized error reports 27. In other words, N may be composed of a set of partial normalization functions.

A program P can be represented as a tuple (F, I), where F denotes the program functionality and I the implementation of the program. Without software diversity, the program having functionality F usually has a single implementation I. With software diversity, a program with functionality F has a set of implementations $P_F = \{I_1 \ldots I_n\}$. Diversity derives its security properties from the fact that $I_i \neq I_j$ for $i \neq j$ since exploitation of software vulnerabilities and other malicious behaviors are typically implementation dependent. While it is preferred to expose divergent implementations to attackers, it is also preferred not to expose the effects of software diversity to software developers—hence error report normalization. Out of all the possible implementations of a program with functionality F a canonical program implementation may be designated as $I_C \in P_F$. There are no constraints on the choice of the canonical program implementation; although the choice will typically be the implementation created without any diversification. A diversified error report is one that reflects the implementation details of any implementation $I \in PI$. Analogously, a normalized error report is one that reflect the implementation details of the canonical implementation $I_C$. Formally, the normalization is the transformation $N(E_I, M_I) \rightarrow E_C$ where $M_I$ is the meta-data recording the implementation-level differences between I and $I_C$, $E_I$ is the error report generated by implementation I, $E_C$ is the error report generated by the canonical implementation $I_C$, and N is the normalization function.

The normalization meta-data $M_I$ depends on the diversifying transformations that were used to make the implementations I and $I_C$ diverge. F. Cohen, Operating system protection through program evolution. *Computers and Security*, 12(6):565-584, Oct. 1993, and P. Larsen, A. Homescu, S. Brunthaler, and M. Franz. SoK: Automated software diversity. In *Proceedings of the 34th IEEE Symposium on Security and Privacy*, S&P '14, 2014, both of which are incorporated by reference herein, catalog numerous code transformations used to introduce software diversity. For instance, if the code layout is diversified by inserting no-operation instructions, NOPs, the meta-data can describe where the NOPs were added or summarize their effects on the code layout. Similarly, if the register assignment is randomized, the diversification meta-data may describe how, at each program location, the register contents differs between I and $I_C$. If multiple code transformations were used to introduce diversity, the meta-data can summarize the effects of each individual transformation, the aggregate effects of all transformations, or any combination thereof.

N. Kumar, B. Childers, and M. L. Soffa. Transparent debugging of dynamically optimized code. In *Proceedings of the 7th Annual IEEE/ACM International Symposium on Code Generation and Optimization*, CGO '09, pages 275-286, Washington, DC, USA, 2009. IEEE Computer Society, incorporated by reference herein, describes how to compute meta-data that summarizes the effects of code transformations. The meta-data generated by Kumar is intended to aid debugging and describes the effect of transformations intended to optimize code with respect to running time or size. These differences notwithstanding, the algorithms to summarize the effects of code transformations is one way to construct the meta-data that may be used for error-report normalization.

Figure 3:
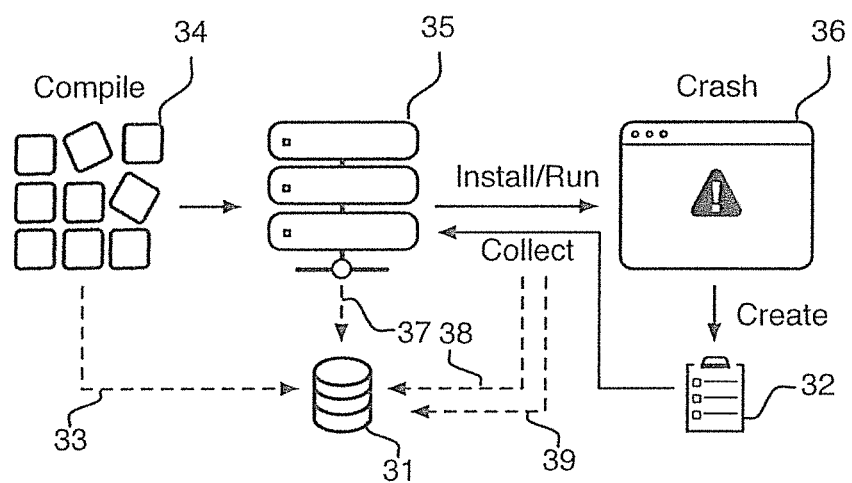
FIG. 3 is a block diagram showing normalization metadata creation in accordance with aspects of the invention.

There are multiple ways to create normalization meta-data; FIG. 3 illustrates several of these. The meta-data 31 used to translate an error report 32 can be created at compilation/translation time 33 (for example by a compiler 34), created 37 by an online software distribution service 35 as or after the software is uploaded to the online software distribution service by a client device, when the software is installed, loaded, or run 38, or as the crash report is being collected 39 at the error reporting server 35, on the client hosting the defective software 36, or on a third, auxiliary server (not shown). For example, normalization meta-data can be created during:

Compilation—A compiler translates source code written by humans to machine code executed by microprocessors. A compiler can introduce software diversity in one of two ways. It can randomize the code as it is being compiled so that multiple binaries can be created from the same source code. In this case, the compiler can output the normalization meta-data. Alternatively, it may prepare the binary for randomization at a later time. For instance, it may insert code such that a program randomizes itself as it is loaded by the operating system or as it is running. In this case, the compiler can simultaneously add code such that the program produces normalization meta-data as it randomizes itself.

Installation/Execution—In some cases, it is desirable to diversify programs for which the source code is not available. In that case, diversification is typically performed directly on the program binaries containing machine code. Binary rewriters analyze and modify binaries even if they are stripped of any debugging information (herein the term debugging information may refer to any information that relates machine code to source code). Such rewriting typically happens as programs are installed on the host machine, as they are being loaded by the operating system prior to execution, or during execution. In an instantiation of this invention where a rewriter is used to diversify a binary, the rewriter may simultaneously emit normalization meta-data.

In an instantiation where a rewriter is used to make a binary self-randomizing, the rewriter simultaneously adds code such that the rewritten binary produces normalization meta-data as it randomizes itself.

Error Reporting—The generation of meta-data can also be deferred until after an error has been detected. Diversification can be done such that the randomization process is driven and identified by a seed value. The combination of the seed value, the input program (in source or binary form) and the diversification engine (a diversification engine is defined herein as one transforming source code, intermediate code, machine code or any combination thereof with the intent to artificially randomize program implementation aspects) uniquely defines the diversified program. As a result, the meta-data can be generated by repeating the process that generated the diversified program and recording the effects of the randomizing transformations. The generation of the normalization meta-data can happen on the client that will report an error (e.g. 36 in FIG. 3) or on any other systems that can transmit the normalization meta-data to the system that will normalize the error-report. For instance, upon detecting an error condition, the client may request the normalization meta-data from the software distribution mechanism (e.g. an "App Store") hosting the faulty program; the client may use the seed value (or a value derived from it) to identify the appropriate meta-data.

Independently of the meta-data creation process, we can store meta-data on the error reporting server 35, the client hosting the detective software 36, on a third, auxiliary server (not shown), or any combination of these.

Figure 4:
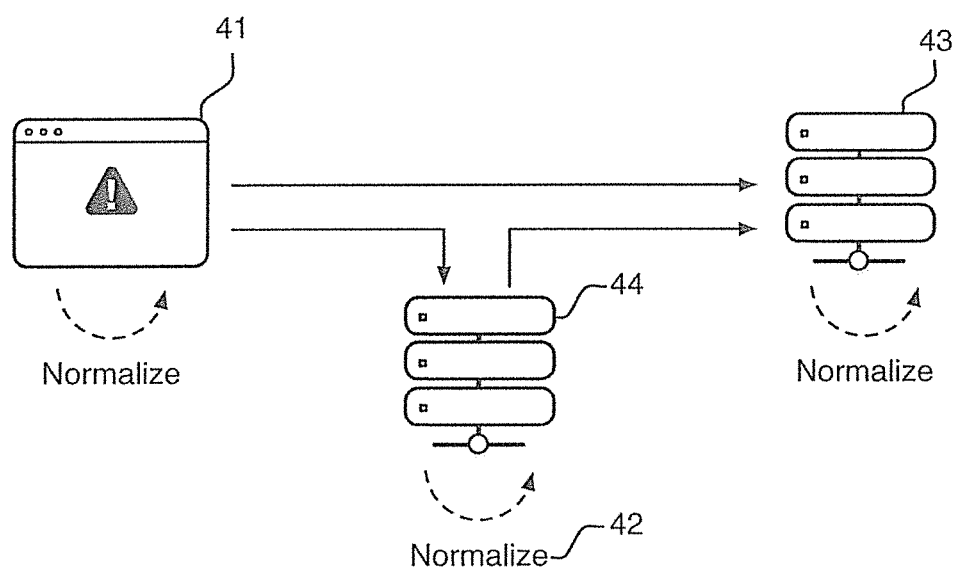
FIG. 4 is a block diagram showing places where normalization can take place in accordance with aspects of the invention.

As shown in FIG. 4, the normalization function N 42 may be executed on the client reporting the error 41, on the system that collects error reports 43, on a third, auxiliary system 44, or any combination thereof. If the meta-data is not stored on the system that executes the normalization function, the meta-data may be shipped to the normalizing system using best practices to secure and compress the communication.

It may be desirable to keep the meta-data confidential during transmission and at rest since it could otherwise reveal client-specific implementation details to attackers and thereby defeat the purpose of diversity. To guard against instances where normalization meta-data is inadvertently disclosed, decoy data can be weaved into the proper meta-data to confuse, mislead and deceive adversaries.

There are numerous possible instantiations of the program normalization function. For example, all diversified programs may share the same program normalization function that processes implementation specific normalization meta-data. Alternatively, the program normalization function can be customized to each program implementation. In this instantiation of the invention, the normalization function can encode the normalization meta-data (in part or fully) thereby removing the distinction between the two. As with the normalization meta-data, the normalization function can be generated as the program binary is created by a compiler or updated by a binary rewriter. It can also be created on-demand as a program prepares to create and send an error report. Similar to the storage meta-data, the normalization function can be stored as part of the program binary or stored remotely and downloaded on an as-needed basis.

The normalization function can be comprised of machine code generated ahead of time or dynamically. Such code may create vulnerabilities that attackers can exploit and may therefore also be hardened, e.g. via software diversity, sand-boxing, or integrity checks. It can also take the form of data forming a stream of virtual instructions to be interpreted. In cases where the normalization function (or parts of it) is downloaded on-demand, the normalization function may vary over time. For instance, the normalization function may be updated to recognize closed/fixed bugs and suppress error reports for these or it may recognize known/open bugs and omit parts of the error report that matches previous reports relating to the same bug.

The normalization function, the normalization data, and diversified error reports may be versioned. Over the lifetime of a diversified program, the randomizing code transformations and the way they are applied may change in response to new threats, changes to distribution, testing and error reporting practices, or due to optimizations and improvements in the use of software diversity. Changes to the code transformations may in turn necessitate changes to the normalization function, therefore, diversified error reports may include an identification or summary of the diversification engine that protects the defective program. The normalization data and normalization function may similarly contain information recording (or code to determine) which types of code transformations they are compatible with.

Symbolic Error Report Normalization

Software developers write source code and understand problems in terms of source code. Error reports, on the other hand summarize the program execution at the machine level. Symbolication denotes the process of mapping a machine-level information into source-level information; this lets developers trace errors and crashes to problems in code they wrote. Correlation of error reports can be done after symbolication; software diversity does not change the source code (Some diversification approaches work by rewriting the source code, however, generally it is assumed the software developers will keep the original, unmodified source code around.), so the implementation level divergence caused by diversity is removed through symbolication. For instance, one might consider all error reports that translate to the same source location as manifestations of the same bug.

In this instantiation of the invention, the debug information used for symbolication is customized to each program implementation. Formally, we extend our representation of a program to a triple $(F, I, D_I)$ where F is the program functionality, $I \in P_I$ is an implementation of F, and $D_I$ is the debug information corresponding to implementation I. Error report symbolication is then the function $S(E_I, D_I) \rightarrow E^t$ where $E_I$ is an error report containing machine level information, and $E^t$ is the symbolicated error report containing source code information. Symbolication has the property that $S(E_{I_1}, D_{I_1}) = S(E_{I_2}, D_{I_2})$ if $E_{I_1}$ and $E_{I_2}$ are manifestations of the same underlying, deterministic bug even though the bug was observed in different program implementations.

In this instantiation, there is no canonical program implementation $I_C$, normalization happens during symbolication, and program debug information is the normalization meta-data.

Although the invention has been discussed with respect to various embodiments, it should be recognized that the invention comprises the novel and non-obvious claims supported by this disclosure.

What is claimed is:

1. A method useful in providing error reports for computer program execution on a computer system, comprising:
receiving information regarding computer system status at a time of failure of proper execution of a diversified implementation of a computer program, the computer program having a plurality of diversified implementations; and transforming, by at least one computer, the information regarding the computer system status using meta-data indicative of differences between the diversified implementation of the computer program and a canonical implementation of the computer program.

2. The method of claim 1, wherein the transformed information regarding the computer system status comprises a normalized error report.

3. The method of claim 1, wherein the canonical implementation of the computer program is one of the plurality of diversified implementations of the computer program.

4. The method of claim 1, wherein the canonical implementation of the computer program is created prior to creation of the plurality of diversified implementations.

5. The method of claim 2, wherein the normalized error report reflects implementation details of the canonical implementation.

6. The method of claim 1, wherein the meta-data indicates differences between at least one Of stack, heap, and register contents on a program location basis between the diversified implementation and the canonical implementation.

7. The method of claim 1, wherein the computer system transforms the information regarding the computer system status using the meta-data.

8. The method of claim 1, further comprising transmitting the transformed information regarding the computer system status to a server, and further transforming the transformed information by the server using additional meta-data indicative of differences between the diversified implementation and the canonical implementation.

9. The method of claim 8, where the further transformed information comprises a normalized error report.

10. The method of claim 1, further comprising transmitting the information regarding the computer system status to a server, and wherein the server transforms the information regarding the computer system status using the meta-data.

11. A method useful in providing error reports for computer program execution on a computer system, comprising:

receiving information regarding computer system status at a time of failure of proper execution of a diversified implementation of a computer program, the computer program having a plurality of diversified implementations: and transforming the information regarding the computer system status using meta-data indicative of differences between the diversified implementation of the computer program and a canonical implementation of the computer program, wherein transforming the information regarding the computer system status using meta-data indicative of differences between the diversified implementation and the canonical implementation comprises performing a plurality of transformations in sequence, each transformation other than a last transformation in the sequence producing a partially normalized error report, each of the plurality of transformations using meta-data partially indicative of differences between the diversified implementation and the canonical implementation.

12. The method of claim 11, wherein at least some of the plurality of transformations are performed on different computers.

13. The method of claim 1, wherein the transformation is performed by a normalization function, with the normalization function encoding the meta-data.

14. The method of claim 1, wherein the meta-data is created in conjunction with creation of the diversified implementation.

15. The method of claim 1, further comprising:

after the time of failure of proper execution of the diversified implementation, generating the meta-data using a seed value used in a process of creating the diversified implementation.

16. A non-transitory computer readable memory storing program instructions, the program instructions comprising program instructions to configure at least one processor to:

receive an error report indicating status of a computer at a time of error in operation of a diversified implementation of a computer program, the computer program having a plurality of diversified implementations; and at least partially transform, based on meta-data reflecting differences between the diversified implementation of the computer program and a canonical implementation, the error report indicating status of the computer at the time of error in operation of the diversified implementation of the computer program to an at least partially normalized error report that at least partially removes effects of diversification of the computer program that resulted in the diversified implementation of the computer program.

17. The non-transitory computer readable memory storing program instructions of claim 16, wherein the program instructions include program instructions to only partially transform the error report indicating status of the computer at the time of error in operation of the diversified implementation of the computer program to only a partially normalized error report that only partially removes effects of diversification that resulted in the diversified implementation of the computer program.

18. The non-transitory computer readable memory storing program instructions of claim 16, wherein the program instructions include program instructions to fully transform the error report indicating status of the computer at the time of error in operation of the diversified implementation of the computer program to a normalized error report that removes all effects of diversification that resulted in the diversified implementation of the computer program.

19. The non-transitory computer readable memory storing program instructions of claim 16, wherein the meta-data is encoded in the program instructions.

\* \* \* \* \*